March 23, 1943. F. W. BERWICK ET AL 2,314,384
DEVICE FOR DELIVERING MEASURED QUANTITIES OF LIQUID
Filed July 24, 1940 2 Sheets-Sheet 1

WITNESS:
Rob P Mitchel

INVENTORS
Frederick William Berwick
and Albert George Berwick
BY
Busser and Harding
ATTORNEYS

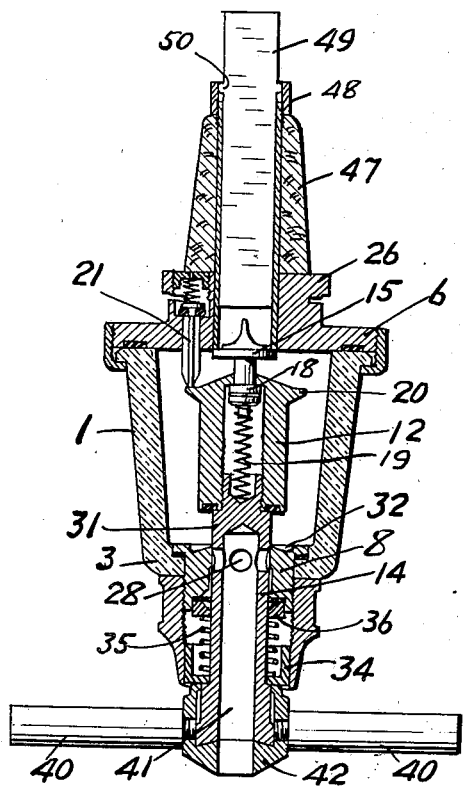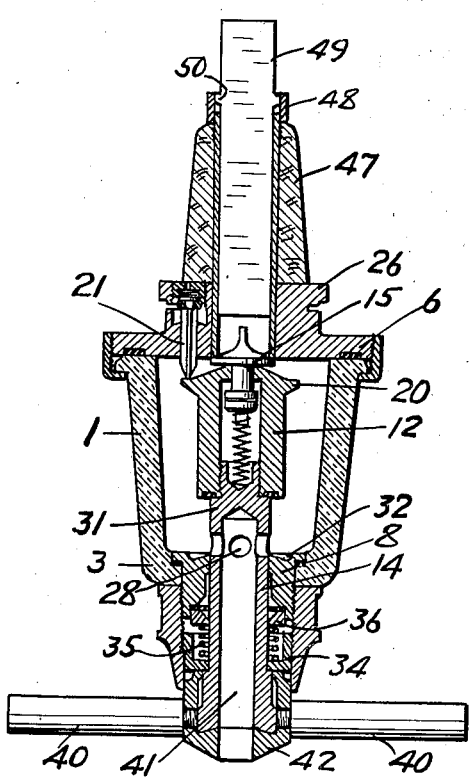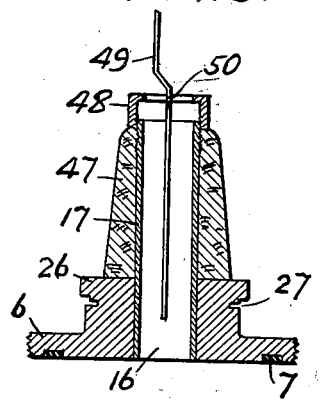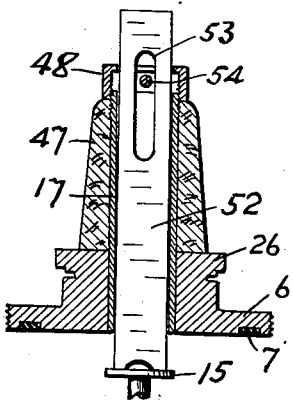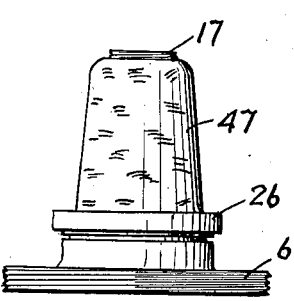

Patented Mar. 23, 1943

2,314,384

UNITED STATES PATENT OFFICE 2,314,384

DEVICE FOR DELIVERING MEASURED QUANTITIES OF LIQUID

Frederick William Berwick and Albert George Berwick, Streatham, London, England, assignors to The De Laval Separator Company, New York, N. Y., a corporation of New Jersey Application July 24, 1940, Serial No. 347,324 In Great Britain July 24, 1939

11 Claims. (Cl. 221—112)

This invention relates to devices for delivering measured quantities of liquid and has particular reference to devices of the kind wherein the inlet to and exit from a measuring chamber as well as the inlet of air to the measuring chamber are all controlled by the movement of a single axially movable operating element.

In measuring devices of this character some difficulty has been experienced in dismantling and reassembling the component parts for cleaning purposes by unskilled operatives and it is one object of the present invention to provide an improved form of measuring device which can be assembled and dismantled without the use of tools and with the minimum number of operations.

A further object of the invention is to provide constructional improvements whereby there is no risk of contact with sealing washers, springs and like components which may be liable to discolor or contaminate certain liquids especially those used for drinking purposes.

According to the invention an improved device for delivering measured quantities of liquid of the kind above referred to is provided wherein the measuring chamber with its inlet and discharge components are assembled by means of manually operable connections at the top and bottom of the measuring chamber and by operation of which the upper and lower ends of the walls of the measuring chamber are caused to make sealing engagement with cover and base elements in such manner that sealing elements are maintained out of contact with the liquid which enters the measuring chamber.

According to one form of the invention a device for delivering measured quantities of liquid of the kind above referred to is provided wherein a cover element carrying the liquid inlet means is adapted to be detachably clamped to the top of the measuring chamber with a sealing element interposed between them and wherein the operating mechanism is carried by an element adapted to be inserted through the base of the said measuring chamber and to be clamped in position therein with a sealing element interposed between said element and the base of the said chamber, both of said sealing elements being maintained out of contact with the liquid which enters the measuring chamber.

According to the preferred form of the invention a device for delivering measured quantities of liquid is provided comprising a measuring chamber having an outward flange at its upper end and an inward flange at its lower end, a cover element having a liquid inlet and an air valve adapted to be detachably connected to said measuring chamber with a sealing element resting upon the upper flange and maintained out of contact with liquid, a flanged sleeve adapted to be mounted in the base of said chamber with a sealing element resting upon the lower flange thereof and maintained out of contact with liquid, an axially movable operating member carried in said flanged sleeve and a flexible sealing element carried by said flanged sleeve and making contact with said operating member to prevent leakage of liquid.

Reference will now be made to the accompanying drawings which illustrate constructional embodiments of the invention and in which:

Fig. 3 is a sectional elevation showing the inlet valve closed.

Fig. 4 is a sectional elevation showing the discharge position.

Fig. 5 is a sectional elevation of the cover and certain parts carried thereby taken at an angle of 90° to the cover as shown in Figs. 2, 3 and 4.

Fig. 6 is a sectional elevation of a modification of the cover construction of Figs. 2, 3, 4 and 5.

Fig. 7 is an elevation of part of the cover construction.

Figure 1:
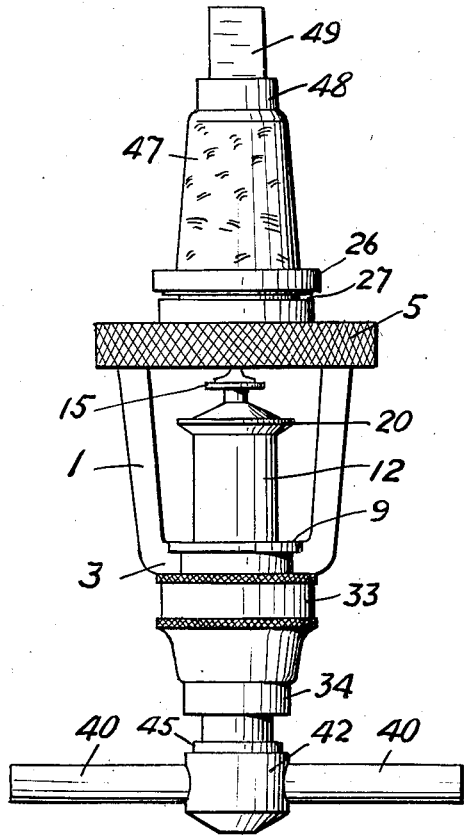
Fig. 1 is an elevation of a liquid measuring device.

In the construction illustrated, a measuring chamber 1, which may be of glass, stainless steel, or of a synthetic resin material, is of substantially cylindrical or slightly tapered form with an external flange or lip 2 around its upper end and an inwardly directed flange 3 at its lower end. The flange 2 at the upper end of the measuring chamber 1 is adapted to be engaged by an inwardly directed flange 4 formed on an internally screw threaded ring 5 which engages the cover 6 of the measuring chamber, this cover having at its underside an annular recess in which a sealing washer 7 is adapted to be seated in such manner that on assembly the said sealing washer is compressed between the cover and the upper end of the chamber until they are in contact, one with the other, and thus shut it off from contact with the liquid which fills the measuring chamber from time to time.

Within the lower end of the measuring chamber 1 is a flanged sleeve 8 the underside of its flange 9 carrying in a recess a seating member or washer 10 adapted to bear upon the inwardly directed flange 3 at the base of the measuring chamber, the engagement between these co-operating parts being also such that the washer or the like is maintained out of any possible contact with the contents of the measuring chamber. The sleeve 8 projects to the exterior of the measuring chamber and is externally screw threaded as shown at 11.

Movably mounted in the said flanged sleeve is an axially movable operating member which consists of an upper portion 12 detachably connected, as by the screw thread connection 13, with a lower portion 14 of smaller diameter than the upper portion 12. The operating member 12—13—14 is constructed substantially in accordance with that described in the patent issued to Ransom & Berwick September 13, 1937, No. 2,093,365, in that it is designed to perform three functions:

1. The upper end of the said operating member is provided with a valve element 15 adapted to close the inlet 16 to the measuring chamber which is formed at the lower end of a tube 17 mounted centrally in the cover 6. The valve element 15 is movable within the head of the operating member, the extent of its movement upward being limited by a collar 18 and below it is a coiled spring 19 which is compressed by the continued upward movement of the operating member after the inlet 16 has been closed and thereby holds the valve element 15 in closing position for as long as the upward pressure on the operating member is maintained.

2. The operating member has a flanged head 20 adapted to engage the stem 21 of a valve 22 mounted in the cover 6, the upward pressure on the said operating member causing the valve 22 to open against the pressure of a spring 23 and allow air to pass down the fluted sides of the stem 21 and cause the discharge of liquid from the measuring chamber 1. The valve 22 is disposed in a recess 24 on the upper side of the cover 6, the spring abutting against the underside of a grub screw 25 by which the pressure of the spring can be adjusted. The central portion 26 of the cover 6 is of greater depth than the outer portion and has a peripheral groove 27 which intersects the recess 24 and thereby admits air to the measuring chamber 1 when the valve 22 is lifted as described.

3. The lower portion 14 of the operating member is of tubular form but is closed at its upper end near which are ports 28 through which liquid escapes from the measuring chamber when the said operating member is raised.

The base of the upper portion 12 of the operating members is formed with a shoulder 29 the under surface of which has an annular recess in which a sealing member 30, of a material such as cork or rubber which will not injuriously affect or be affected by the liquid, is situated. This sealing member is held in this position by the head 31 of the portion 14 which partly overlaps the said sealing member whose outer portion overlaps the inner edge of the upper end of the flanged sleeve 8 to prevent leakage of liquid out of the measuring chamber when the device is inoperative. The said inner edge of the flanged sleeve is recessed as shown at 32 to form an upwardly projecting edge which positively engages in the sealing member 30. The flanged sleeve 8 is held in position by means of a screw threaded locking sleeve 33 engaging the screw threaded portion 11. The lower portion 14 of the operating member carries a short sleeve 34 by which the operating member is guided in the locking sleeve 33 and in which is seated the base of a spring 35 which is compressed by upward movement of the operating member and restores it to normal position after operation. The upper end of the spring 35 bears against a ring 36 freely mounted in the lower end of the flanged sleeve 8 and between this ring and a shoulder 37 near the lower end of sleeve 8 is mounted a sealing member 38 which consists of an annular disc of indiarubber or synthetic indiarubber whose inner edge is free to move within an annular chamber 39 having upwardly and downwardly diverging walls formed by chamfered surfaces on the sleeve 8 and ring 36 respectively. The inner portion of the sealing member 38 is thus free to oscillate with the movements of the operating member. The dimensions of the sealing member 38 are such that its inner portion is normally bent out of the horizontal so that one of its inner edges makes line contact with the outer surface of part 14 of the operating member. As this member is moved upwardly (that is inwardly of the measuring chamber) to effect delivery of a measured quantity of liquid the inner portion of the sealing member 38 can move slightly within the confines of the annular chamber 39 so as to follow the movement of the operating member and maintain line or edge contact with the part 14 thereof and form a seal against leakage in all positions of the said member. The lower end of the operating member is preferably provided with laterally extending arms 40 in the known manner to enable it to be operated by upward pressure of a receptacle to be filled and the lower end of the discharge passage 41 may terminate in a device for preventing the falling of drips which device may be of any suitable form but it is preferably constructed in the following manner: The laterally extending arms are attached to a thimble 42 mounted to move within limits on the lower end of the operating member, this thimble having an internal discharge passage 43 which, in the position of rest, communicates with an annular space 44 between the base of the thimble and the base of the operating member. Upward movement of the thimble relatively to the operating member is limited by engagement of the base of the thimble with the base of the operating member and downward movement of the thimble is limited by engagement of an inwardly directed flange 45 thereon with a shoulder 46 on the operating member. Immediately the pressure on the arms is relaxed after filling a receptacle, the thimble drops to its normal position in which any liquid remaining on the base of the operating member collects in the annular space 44 within the thimble to be ejected therefrom into a receptacle during the next operative movement.

The cover of the measuring chamber is provided with means for attachment to a bottle and these means may be arranged to engage the exterior of the bottle neck or a tapered plug may be provided adapted to enter the bottle neck. In either case the grooved portion 27 of the cover enables it to be engaged by a supporting device or bracket and the said grooved portion permits, under all conditions of use, air to enter the measuring chamber when the air valve 22 is raised by the movement of the operating member.

In the form illustrated, the inlet tube 17 is surrounded by a tapered plug 47 of such a material as cork held in position with its base resting upon the central portion 26 of the cover by a knurled nut 48 engaging a screw thread at the upper end of the said tube.

The tube 17 may be and preferably is provided with a vertical partition 49 mounted within the tube, the lower end of this partition being spaced above the top of the inlet closure valve 15. The partition 49 operates when the valve is moving towards open position to prevent an air lock by allowing air to escape up one side of the partition and a fresh charge of liquid to pass down the other side of the partition.

Vertical displacement of the partition 49 is prevented by forming it with a projection 50 (see Fig. 5) which engages freely an internal recess in the nut 48 so that the partition can be rotated to remove any obstruction or for cleansing purposes. To break up bubble formations in the inlet 16 the head of the valve element 15 is formed with a central upwardly-extending fin 51 which enters the said inlet prior to the closure of the valve. This arrangement, however, while suitable for dealing with liquids such as spirits, is not entirely suitable for liquids such as water or syrups; and for measuring devices which are intended to deal with liquids of the second type, the modified arrangement shown in Fig. 6 is employed. In this form of construction, a partition 52 has a slot 53 in which engages a transverse pin 54 fixed within the nut 48. A substantially flat topped valve element 15 is employed and the base of the partition rests upon this valve. As the valve rises, the partition rises with it, preserving thereby two separate passages through one of which liquid descends and through the other of which air ascends, while the movement through the inlet 16 prevents bubble formation.

Figure 2:
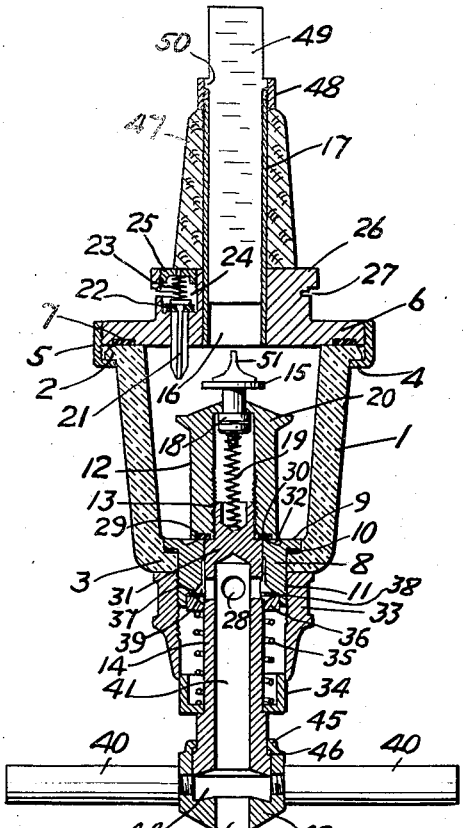
Fig. 2 is a sectional elevation of the measuring device in the rest position.

To position the measuring device above described for operation, the plug 47 is forced into the open neck of a filled bottle which is then inverted and mounted, for example, in a supporting device of the character described in our copending application filed of even date herewith, Serial No. 347,325. The rest position of the device is then as shown in Fig. 2 with the measuring chamber 1 filled with liquid and still in free communication with the interior of the bottle through the inlet tube 17. When a measured quantity of liquid is to be withdrawn, the tumbler or other receptacle which is to receive such quantity, is pressed upwards against the arms 40, first moving the thimble 42 upwards until it abuts against the base of the operating member which thereafter moves upwardly until the valve element 15 closes the inlet 16. This position is shown in Fig. 3, from which it will be clear that when communication with the bottle is cut off by the closing of the valve 15, the air valve 22 is still closed and the outlet ports 28 are still below the base of the measuring chamber. Thus the exact measured quantity of liquid is retained in the measuring chamber without any possibility of reduction or increase until the parts are in position for discharge to take place. After the valve 15 has closed, the continued upward movement of the operating member brings the flange 20 into operative engagement with the stem 21 of the air inlet valve and also brings the ports 28 above the base of the measuring chamber, the parts finally reaching the positions shown in Fig. 4 in which the inrush of air causes the measured quantity of liquid to discharge through the passage 41 into the receptacle whose upper rim is still pressed against the arms 40. When this receptacle is removed the springs 19, 23 and 35 operate to restore the parts automatically to the positions shown in Fig. 2.

The device above described can be very simply and quickly dismantled for cleaning in the following manner:

The arms 40 are unscrewed from the thimble 42 and the separator plate 49 is removed by unscrewing the nut 48. The ring 5 is then unscrewed and removed, allowing the cover 6 and measuring chamber 1 to be separated. The sleeve 33 is next removed, thereby allowing the flanged sleeve 8 with the operating member 12—13—14 and all the parts carried thereby to be withdrawn through the upper end of the measuring chamber 1 which is then free for washing. The parts of the measuring device after dismantling as above described are shown in Fig. 7. As the nut 48, ring 5 and sleeve 33 are all arranged so as to be capable of unscrewing and screwing up by hand, the whole device has the advantage that it can be dismantled and re-assembled without the use of tools.

Figure 8:
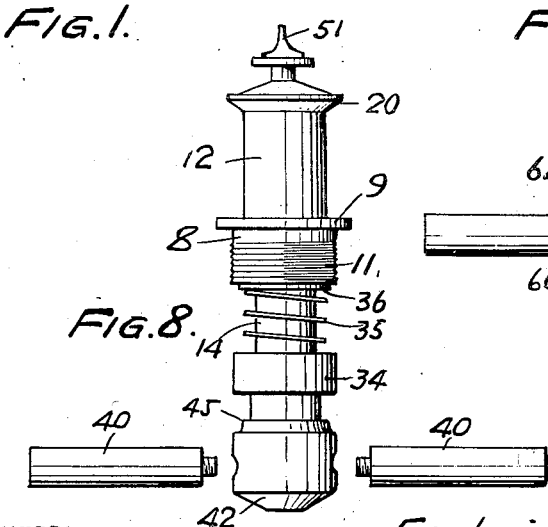
Fig. 8 is a view of the component parts of the measuring device after dismantling.

In Fig. 8, the operating member with its spring 35 and valve 15 is shown dismantled as a unit in which condition the passage 41 and ports 28 can be cleansed.

Figure 9:
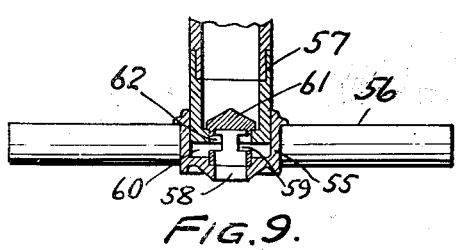
Fig. 9 is a detail sectional view showing an alternative form of drip prevention device.

The alternative construction of drip prevention device shown in Fig. 9 comprises a thimble 55 carrying laterally extending arms 56 and movably mounted, as in the previously described construction, over the lower end of a central operating member 57. The thimble 55 has a central discharge passage 58, which, in the rest position shown, communicates by means of ports 59 with an annular space 60 between the base of the thimble and the base of the operating member 57. The inner end of the passage 58 is closed by an element 61 which normally fills the discharge outlet 62 in the base of the member 57 so that only when upward pressure is applied to the thimble and it is raised relatively to the member 57 can the ports 59 communicate with the interior of the operating member 57 and permit discharge of a quantity of liquid. Immediately the pressure on the thimble is relaxed the thimble drops to the normal position shown in which the element 61 acts as a closure valve to prevent any liquid running down the internal walls of the operating member 57 from falling in drips from the lower end thereof.

We claim:

1. A device for delivering measured quantities of liquid comprising a measuring chamber composed of a body and a cover separable therefrom and carrying a supply conduit, an operating member extending from within said chamber through the bottom thereof and reciprocable to open communication between said conduit and said chamber and prevent entering liquid from discharging from said chamber and alternately therewith to close communication between said conduit and chamber and allow liquid to be discharged from said chamber, the bottom of the measuring chamber including a closure sleeve within which said operating member is reciprocable, a member adapted to hold the cover to said body and which is operable to allow the cover to be removed therefrom, and a locking member holding said sleeve in rigid relationship with said body and which is removable to allow the withdrawal of the operating member and closure sleeve through the open top of the measuring chamber after the cover is removed therefrom.

2. The device defined in claim 1 comprising seals between said cover and the top of said chamber body, between said operating member and said closure sleeve and between said closure sleeve and said body, the first and last of which are so located as to be out of contact with the liquid which enters the measuring chamber while said conduit is open thereto.

3. A device for delivering measured quantities of liquid comprising a measuring chamber having a top with an inlet to receive liquid and a bottom opening, a closure sleeve inserted in said bottom opening, an operating member reciprocable in said sleeve and operable in one position to open said inlet and prevent entering liquid from discharging from said chamber and in another position to close said inlet and allow liquid to be discharged from said chamber, a ring carried on the lower end of said sleeve and forming between it and said sleeve an annular chamber with divergent walls, and a sealing member confined between said sleeve and ring and which contacts with said operating member and is oscillatable during the reciprocating movement of said member to maintain edge contact therewith.

4. A device for delivering measured quantities of liquid comprising a measuring chamber composed of a body and a cover separable therefrom and carrying a supply conduit, an operating member extending from within said chamber through the bottom thereof and reciprocable to open communication between said conduit and said chamber and prevent entering liquid from discharging from said chamber and alternately therewith to close communication between said conduit and chamber and allow liquid to be discharged from said chamber, the bottom of the measuring chamber including a closure sleeve within which the lower part of said operating member is reciprocable, the upper part of said operating member being of greater diameter than said lower part, and a sealing member at the bottom of the upper part of said operating member whose outer edge extends within the periphery of the upper part, but beyond the periphery of the lower part, of said operating member, the inner edge of said closure sleeve being recessed to form an upwardly projecting edge which, when the operating member is in its lowermost position, engages in said seal.

5. A device for delivering measured quantities of liquid comprising a measuring chamber composed of a body and a cover separable therefrom and carrying a supply conduit, an operating member extending from within said chamber through the bottom thereof and reciprocable to open communication between said conduit and said chamber and prevent entering liquid from discharging from said chamber and alternately therewith to close communication between said conduit and chamber and allow liquid to be discharged from said chamber, the bottom of the measuring chamber including a closure sleeve having at its upper end a peripheral flange which engages the inwardly flanged end of the chamber body, said operating member being recirocable in said sleeve, a locking sleeve below said chamber and holding said closure sleeve in engagement with said body and which is detachable to allow the withdrawal of the operating member and closure sleeve through the open top of the measuring chamber after the cover is removed therefrom.

6. A device for delivering measured quantities of liquid comprising a measuring chamber having a body and a cover, a liquid-supply tube carried by said cover, an operating member extending from within said chamber through the bottom thereof and reciprocable to open communication between said tube and said chamber and prevent liquid from discharging from said chamber and alternately therewith to close communication between said tube and said chamber and allow liquid to be discharged from said chamber, and a partition mounted within, and extending longitudinally of, said tube and adapted, when the operating member is in position to open communication between the conduit and said chamber, to allow air to escape up one side thereof and a fresh charge of liquid to pass down the other side thereof.

7. A device for delivering measured quantities of liquid comprising a measuring chamber having a body and a cover, a liquid supply tube carried by said cover, a tubular member extending from within said chamber through the bottom thereof and reciprocable in said body and adapted in one position of the tubular member to open communication between said chamber and the tubular member and thereby allow escape of liquid from said chamber and in another position to close communication between said chamber and the tubular member and thereby prevent escape of liquid from said chamber, a valve carried on the upper end of said member adapted in the first named position of said member to close communication between said supply tube and chamber and in the second named position to open said communication, and a partition extending longitudinally of said supply tube and adapted, when said valve is opened to prevent air lock by providing on its opposite sides a passage for upflow of air and a passage for downflow of liquid, said partition being longitudinally movable and adapted, in the upward movement of the valve, to be engaged thereby and moved upward in said tube.

8. A device for delivering measured quantities of liquid comprising a measuring chamber having a body and a cover, a liquid supply tube carried by said cover, a member extending from within said chamber through the bottom thereof and reciprocable in said body and having a passage adapted in one position of said member to allow escape of liquid from said chamber and in another position to prevent escape therefrom, a valve carried on the upper end of said reciprocable member adapted in the first named position of said member to close communication between said tube and chamber and in the second named position to open said communication, a thimble with a central bottom opening and having a limited movement on the lower end of said operating member, laterally extending arms on said thimble, a device carried by said thimble and comprising a valve adapted to close the discharge from the passage in the operating member when the thimble is in its lower position and a port through which said central opening communicates with the interior of the thimble when the thimble is in its lower position, said port establishing communication between said passage and said thimble opening only when the thimble is in its upper position.

9. A device for delivering measured quantities of liquid comprising a measuring chamber having a body and a cover, a liquid supply tube carried by said cover, a tubular member extending from within said chamber through the bottom thereof and reciprocable in said body and adapted in one position of the tubular member to open communication between said chamber and the tubular member and thereby allow escape of liquid from said chamber and in another position to close communication between said chamber and the tubular member and thereby prevent escape of liquid from said chamber, a valve carried on the upper end of said member adapted in the first named position of said member to close communication between said supply tube and chamber and in the second named position to open said communication, and a partition extending longitudinally of said supply tube and adapted, when said valve is opened to prevent air lock by providing on its opposite sides a passage for upflow of air and a passage for downflow of liquid, said valve having a central upwardly extending fin which in the closing movement of the valve moves into the opening between the supply tube and the chamber.

10. A device for delivering measured quantities of liquid comprising a measuring chamber having an opening in its bottom, a cover removable therefrom and carrying a supply conduit, an operating member extending from within said chamber through the bottom thereof, a closure for the bottom of the measuring chamber slidable in said opening and surrounding said operating member and having an annular flange extending over the bottom of said chamber, the operating member being reciprocable in said closure to open communication between said conduit and chamber and prevent liquid from discharging from said chamber and alternately therewith to close communication between said conduit and chamber and allow liquid to be discharged from said chamber, and a sleeve screw-threaded onto said bottom closure and adapted to thereby hold the flange thereof against and in fixed relation with said body bottom and which is removable to allow the operating member and the bottom closure to be removed through the open top of the measuring chamber after the cover is removed therefrom.

11. A device for delivering measured quantities of liquid comprising a measuring chamber having an opening in its bottom, a cover removable therefrom and carrying a supply conduit opening into the upper end of the measuring chamber, an operating member extending within said chamber from below the supply conduit through the bottom of said chamber, a sleeve surrounding the operating member and extending through and slidable in said opening and closing the bottom of the measuring chamber, the operating member being reciprocable in said sleeve to close communication between said conduit and chamber and allow liquid to be discharged from said chamber and alternately therewith to prevent liquid from discharging from said chamber and open communication between said conduit and chamber, and another sleeve adapted to hold the first named sleeve in fixed relation to the body but which is removable to free the first named sleeve and allow it and the operating member to be removed through the open top of the measuring chamber after the cover is removed therefrom.

FREDERICK WILLIAM BERWICK.
ALBERT GEORGE BERWICK.